United States Patent
Dubois et al.

(10) Patent No.: US 10,695,724 B2
(45) Date of Patent: *Jun. 30, 2020

(54) ANTI-FOULING COATINGS WITH STAR POLYMERS FOR FILTRATION MEMBRANES

(71) Applicant: International Business Machines Corporation, Armonk, NY (US)

(72) Inventors: Geraud J. Dubois, Los Altos, CA (US); Robert D. Miller, San Jose, CA (US); Young-Hye Na, San Jose, CA (US); Victoria Piunova, San Jose, CA (US); Joseph Sly, San Jose, CA (US); Andy T. Tek, San Jose, CA (US); Ran Wang, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/899,393

(22) Filed: Feb. 20, 2018

(65) Prior Publication Data

US 2018/0178168 A1     Jun. 28, 2018

Related U.S. Application Data

(62) Division of application No. 14/623,352, filed on Feb. 16, 2015, now Pat. No. 9,931,598.

(51) Int. Cl.
*B01D 69/10* (2006.01)
*B01D 69/12* (2006.01)
(Continued)

(52) U.S. Cl.
CPC ......... *B01D 69/10* (2013.01); *B01D 67/0088* (2013.01); *B01D 67/0095* (2013.01);
(Continued)

(58) Field of Classification Search
CPC ........ B01D 69/10; B01D 69/02; B01D 69/12; B01D 67/0088; B01D 67/0095;
(Continued)

(56) References Cited

U.S. PATENT DOCUMENTS 4,087,388 A   5/1978   Jensen et al.
4,277,344 A   7/1981   Cadotte
(Continued)

FOREIGN PATENT DOCUMENTS

CN   1394901 A    2/2003
CN   101053779 A   10/2007
(Continued)

OTHER PUBLICATIONS

"List of IBM Patents or Patent Applications Treated as Related," Appendix P, 2 pp.

(Continued)

*Primary Examiner* — Pamela H Weiss
(74) *Attorney, Agent, or Firm* — H. Sanders Gwin, Jr.; Shumaker & Sieffert, P.A.

(57) ABSTRACT

A porous membrane with a molecular weight cut-off (MWCO) greater than about 10 kDa, and a coating on at least a portion of a major surface of the porous membrane. The coating includes a star polymer having a hydrophobic core and hydrophilic arms, wherein the hydrophobic core contacts the porous membrane.

9 Claims, 4 Drawing Sheets

(51) Int. Cl.
  *B01D 69/02* (2006.01)
  *B01D 67/00* (2006.01)
  *B01D 61/14* (2006.01)
  *C09D 5/16* (2006.01)
  *B01D 71/68* (2006.01)
(52) U.S. Cl.
  CPC .............. *B01D 69/02* (2013.01); *B01D 69/12* (2013.01); *B01D 61/145* (2013.01); *B01D 61/147* (2013.01); *B01D 2323/00* (2013.01); *B01D 2325/14* (2013.01); *B01D 2325/16* (2013.01); *B01D 2325/20* (2013.01)
(58) Field of Classification Search
  CPC .............. B01D 61/145; B01D 2325/16; B01D 2325/14; B01D 61/147; B01D 2325/20; B01D 2323/00; B01D 2325/38; B01D 2323/04; B01D 2323/26; B01D 71/68; B01D 71/34; C09D 5/1668
  See application file for complete search history.

(56) References Cited

U.S. PATENT DOCUMENTS

| | | | |
|---|---|---|---|
| 4,704,324 A | 11/1987 | Davis et al. | |
| 4,737,550 A | 4/1988 | Tomalia | |
| 4,824,568 A | 4/1989 | Allegrezza, Jr. et al. | |
| 5,171,264 A * | 12/1992 | Merrill | A61L 33/0029 427/2.24 |
| 5,482,634 A | 1/1996 | Goerlach-Doht et al. | |
| 6,383,500 B1 * | 5/2002 | Wooley | A61K 9/5138 424/401 |
| 7,365,142 B2 | 4/2008 | Schlenoff et al. | |
| 7,470,369 B2 * | 12/2008 | Diallo | B01D 61/04 210/257.2 |
| 7,713,544 B2 | 5/2010 | Chaikof et al. | |
| 7,825,199 B1 | 11/2010 | Matyjaszewski et al. | |
| 7,918,349 B2 | 4/2011 | Mickols et al. | |
| 8,011,517 B2 | 9/2011 | Allen et al. | |
| 8,061,533 B2 | 11/2011 | Mays et al. | |
| 8,110,679 B2 | 2/2012 | Kriesel et al. | |
| 8,505,743 B2 | 8/2013 | Sarkar et al. | |
| 8,727,135 B2 | 5/2014 | Cheng et al. | |
| 8,765,098 B2 | 7/2014 | Appel et al. | |
| 9,212,258 B2 * | 12/2015 | Hong | C08G 63/912 |
| 9,782,727 B2 | 10/2017 | Dubois et al. | |
| 9,931,598 B2 | 4/2018 | Dubois et al. | |
| 10,086,338 B2 * | 10/2018 | Na | B01D 67/0006 |
| 10,293,308 B2 | 5/2019 | Na et al. | |
| 2004/0050791 A1 | 3/2004 | Herczeg | |
| 2004/0138323 A1 | 7/2004 | Stenzel-Rosebaum et al. | |
| 2006/0280931 A1 | 12/2006 | Mao | |
| 2007/0037933 A1 | 2/2007 | Kurth et al. | |
| 2007/0251883 A1* | 11/2007 | Niu | B01D 61/025 210/653 |
| 2008/0135482 A1 | 6/2008 | Singh et al. | |
| 2009/0053139 A1 | 2/2009 | Shi et al. | |
| 2009/0114596 A1 | 5/2009 | Kriesel et al. | |
| 2009/0203980 A1 | 8/2009 | Carlson et al. | |
| 2011/0076504 A1 | 3/2011 | Van De Weerdt et al. | |
| 2011/0182996 A1* | 7/2011 | Fukushima | C08G 71/02 424/490 |
| 2011/0207841 A1 | 8/2011 | Kosar et al. | |
| 2011/0243848 A1 | 10/2011 | Appel et al. | |
| 2011/0305872 A1 | 12/2011 | Li et al. | |
| 2012/0024789 A1* | 2/2012 | Sarkar | B01D 65/08 210/652 |
| 2012/0048799 A1 | 3/2012 | Na et al. | |
| 2012/0237447 A1* | 9/2012 | Lee | A61K 49/0036 424/9.1 |
| 2012/0241373 A1 | 9/2012 | Na et al. | |
| 2012/0308546 A1* | 12/2012 | Kizhakkedathu | A61K 31/765 424/94.5 |
| 2013/0001153 A1* | 1/2013 | Na | B01D 69/125 210/488 |
| 2013/0112618 A1 | 5/2013 | Diallo et al. | |
| 2013/0146521 A1 | 6/2013 | Brozell et al. | |
| 2014/0042089 A1 | 2/2014 | Matsui et al. | |
| 2016/0008769 A1 | 1/2016 | Dubois et al. | |
| 2016/0236153 A1 | 8/2016 | Dubois et al. | |
| 2016/0236154 A1 | 8/2016 | Dubois et al. | |
| 2017/0361281 A1 | 12/2017 | Dubois et al. | |

FOREIGN PATENT DOCUMENTS

| | | |
|---|---|---|
| CN | 101389690 A | 3/2009 |
| CN | 102688701 A | 9/2012 |
| CN | 102711967 A | 10/2012 |
| CN | 103635242 A | 3/2014 |
| CN | 101437901 B | 7/2014 |
| JP | H05506807 A | 10/1993 |
| JP | 2000334229 A | 12/2000 |
| JP | 3300314 B2 | 7/2002 |
| JP | 2006006381 A | 1/2006 |
| KR | 11238591 B1 | 2/2012 |
| KR | 1011238591 B1 | 2/2012 |

OTHER PUBLICATIONS

"Star Copolymers," The Matyjaszewski Polymer Group, Carnegie Mellon Group, retrieved from http://www.cmu.edu/maty/materials/Polymers_with_Specific_Architecture/star-copolymers.html, on Sep. 11, 2017, 14 pp.
Bigot et al., "A Simplified Wittig Synthesis Using Solid/Liquid Transfer Processes IV—Synthesis of symmetrical and asymmetrical mono-and di-olefins from terephtalic aldehyde," Synthetic Communications, 1993 (Applicant points out, in accordance with MPEP 609.04(a), that the year of publication, 1993, is sufficiently earlier than the effective U.S. filing date, 2017, so that the particular month of publication is not in issue.), vol. 13, No. 2, pp. 177-182.
Cath et al., "Forward osmosis: Principles, applications, and recent developments," Journal of Membrane Science 281, Sep. 2006, pp. 70-87.
Cima et al. "Network Structures of Radiation-Cross-linked Star Polymer Gels," Macromolecules, 1995, Applicant points put, in accordance with MPEP 609.04(a), that the year of publication, 1995, is sufficiently earlier than the effective U.S. filing date, 2017, so that the particular month of publication is not in issue.) 28, 6787-6794.
Decher et al. "Buildup of ultrathin multilayer films by a self-assembly process: III. Consecutively alternating adsorption of anionic and cationic polyelectrolytes on charged surfaces" Thin Solid Films, 210/211, 1992, (Applicant points out, in accordance with MPEP 609.04(a), that the year of publication, 1992, is sufficiently earlier than the ffective U.S. filing date, 2017, so that the particular month of publication is not in issue.)Elsevier Sequoia, pp. 831-835.
Jin et al. "Use of Polyelectrolyte Layer-by-Layer Assemblies as Nanofiltration and Reverse Osmosis Membranes", Langmuir, Feb. 10, 2003, 19, 2550-2553.
Kim et al. "Bio- and oil-fouling resistance of ultrafiltration membranes controlled by star-shaped block and random copolymer coatings,", RSC Advances, 2013, (Applicant points out, in accordance with MPEP 609.04(a), that the year of publication, 2013, is sufficiently earlier than the effective U.S. filing date, 2017, so that the particular month of publication is not in issue.) 3, 18071-18081 pp.
Kim et al. "The increase of antifouling properties of ultrafiltration membrane coated by star-shaped polymers," RSC Advances, 22, 2012, (Applicant points out, in accordance with MPEP 609.04(a), that the year of publication, 2012, is sufficiently earlier than the effective U.S. filing date, 2017, so that the particular month of publication is not in issue.) pp. 8654-8661.
Lu et al., "Nanofiltration Membranes Based on Rigid Star Amphiphiles," Chem. Mater., vol. 19, May 31, 2007, pp. 3194-3204.
Pereira Nunes et al. "Membrane Technology in the Chemical Industry," Second, Revised and Extended Edition, Wiley-VCH GmbH & Co. KGaA, Aug. 23, 2006, 358 pgs.

(56) References Cited

OTHER PUBLICATIONS

Petersen, "Composite Reverse Osmosis and Nanofiltration Membranes" Journal of Membrane Science, 83, Aug. 12, 1993, pp. 81-150.
Plamper et al., "Synthesis and Characterization of Star-Shaped Poly (N,N-dimethylaminoethyl methacrylate) and Its Quarternized Ammonium Salts," Macromolecules, vol. 40, Jul. 6, 2007, pp. 5689-5697.
Su, et al., "Preparation and performance of dynamic layer-by-layer PDADMAC/PSS nanofiltration membrane," Journal of Membrane Science 423-424, Dec. 2012, pp. 324-331.
Wang, et al. "Enhanced forward osmosis from chemically modified polybenzimidazole (PBI) nanofiltration hollow fiber membranes with a thin wall," Chemical Engineering Science 64, 2009, (Applicant points out, in accordance with MPEP 609.04(a), that the year of publication, 2009, is sufficiently earlier than the effective U.S. filing date, 2017, so that the particular month of publication is not in issue.) pp. 1577-1584.
Wei et al., "Synthesis and characterization of flat-sheet thin film composite forward osmosis membranes," Journal of Membrane Science 372, 2011, (Applicant points out, in accordance with MPEP 609.04(a), that the year of publication, 2011, is sufficiently earlier than the effective U.S. filing date, 2017, so that the particular month of publication is not in issue.) pp. 292-302.
Zhang, et al. "Well-constructed cellulose acetate membranes for forward osmosis: Minimized internal concentration polarization with an ultra-thin selective layer," Journal of Membrane Science 360, Sep. 2010, pp. 522-535.
Zhao et al.. "Porous membranes modified by hyperbranched ploymers II. Effect of the arm length of amphiphilic hyperbranched-star polymers on the hydrophilicity and protein resistance of poly (vinylidence fluoride) membranes," Science Direct, Journal of Membrane Science 304, 2007 (Applicant points out, in accordance with MPEP 609.04(a), that the year of publication, 2007, is sufficiently earlier than the effective U.S. filing date, 2017, so that the particular month of publication is not in issue.), pp. 138-147.
Zhao, et al., "Recent developments in forward osmosis: Opportunities and challenges," Journal of Membrane Science 396, 2012, (Applicant points out, in accordance with MPEP 609.04(a), that the year of publication, 2012, is sufficiently earlier than the effective U.S. filing date, 2018, so that the particular month of publication is not in issue.) 21 pp.
Zhao, et al., "Improving Hydrophilicity and Protein Resistance of Poly (vinylidence fluoride) Membranes by Blending with Amphiphilic Hyberbranched-Star Polymer," Lanmuir, Apr. 5, 2007, 23, pp. 5779-5786.
Prosecution History from U.S. Appl. No. 14/623,313, dated May 26, 2017 through Feb. 16, 2018, 65 pp.
Prosecution History from U.S. Appl. No. 14/623,352, dated Jun. 9, 2017 through Jan. 9, 2018, 66 pp.
Office Action from U.S. Appl. No. 15/695,778 dated Jun. 18, 2019, 10 pp.
Office Action from U.S. Appl. No. 15/984,943, dated Jul. 12, 2019, 11 pp.
Response to Office Action dated Jul. 12, 2019, from U.S. Appl. No. 15/984,943, filed Oct. 10, 2019, 8 pp.

\* cited by examiner

ANTI-FOULING COATINGS WITH STAR POLYMERS FOR FILTRATION MEMBRANES

This application is a divisional of U.S. application Ser. No. 14/623,352, filed Feb. 16, 2015, which is incorporated herein by reference in its entirety.

BACKGROUND

Membrane filtration technology has been widely used for liquid purification. However, fouling can become a problem in membrane filtration processes, even if the feed liquid is pre-treated to remove potential foulants. Fouling is a process that results in a decrease in performance of a membrane, caused by the deposition of suspended or dissolved solids on the external membrane surface, on the membrane pores, or within the membrane pores. To reduce fouling, the surface of the membrane may be chemically cleaned, or the system may be flushed periodically to remove foulants on the membrane surface.

In some applications, the surface of the membrane can be chemically modified to reduce fouling. In one example, the surface of the membrane is made more hydrophilic, which can limit hydrophobic interactions between the membrane and some types of foulants. Several materials have been adopted to modify the surface of filtration membranes to increase their hydrophilicity, such as nanoparticles, enzymes and polymers. Various surface modification strategies have been investigated including, for example, blending, surface grafting and surface coating.

SUMMARY

Binding between hydrophilic coating materials and a membrane surface can be weak in an aqueous solution since the hydrophilic coating materials prefer water over the membrane surface, which is hydrophobic. Organic solvents have thus been used to dissolve and deposit hydrophilic coating materials on the membrane surface, but organic solvents can limit the types of hydrophilic coating materials that can be used. In addition, membrane surface modification processes using organic solvents can be more expensive and environmentally undesirable.

In general, the present disclosure is directed to a hydrophilic antifouling coating that can be applied to a surface of a hydrophobic filtration membrane. In some embodiments, the coating is made of a hydrophilic material that can self-assemble on the hydrophobic membrane surface using a simple surface-coating technique in an aqueous environment to produce a hydrophilic anti-fouling monolayer. In various embodiments, the anti-fouling coatings described in this disclosure can be used to efficiently and cost-effectively modify the surfaces of hydrophobic membranes.

In various embodiments, the present disclosure relates to anti-fouling coatings for hydrophobic membranes including star polymers with a hydrophobic core and hydrophilic arms. The hydrophilic arms can include various functional groups with neutral hydrophilic moieties, charged hydrophilic moieties, and combinations thereof. In some embodiments, the functionalized star polymers can be assembled on the surface of the hydrophobic membranes in an aqueous environment through the interaction between the hydrophobic membrane surfaces with the hydrophobic cores, forming a single-layered polymer coating with excellent chemical and physical stability.

In various embodiments, the hydrophobic membranes surface modified with the ultra-thin star polymer coatings showed enhanced anti-fouling behaviors toward organic or emulsified oil foulants, resulting higher water flux in cross-flow filtration processes. Moreover, the star polymer coatings exhibited good chemical and physical stability without a loss of anti-fouling efficiency, and retained high water flux for an extended operating time.

In one aspect, the present disclosure is directed to a porous membrane with a molecular weight cut-off (MWCO) greater than about 10 kDa, and a coating on at least a portion of a major surface of the porous membrane, wherein the coating includes a star polymer having a hydrophobic core and hydrophilic arms, and wherein the hydrophobic core contacts the porous membrane.

In another aspect, the present disclosure is directed to a process of forming a monolayer of self-assembled star polymers on a porous membrane with a MWCO greater than 10 kDa. The process includes applying on a surface of the porous membrane an aqueous solution of star polymers, wherein the star polymers have a hydrophobic core and hydrophilic arms; and draining excess of the aqueous solution of the star polymers to form a coated membrane.

In another aspect, the present disclosure is directed to a porous filtration membrane with a MWCO greater than about 10 kDa, wherein a hydrophobic major surface of the filtration membrane contacts a hydrophilic coating comprising a monolayer of star polymers, wherein the star polymer in the hydrophilic coating comprises a hydrophobic microgel core comprising polystyrene (PS) adjacent to the hydrophobic major surface and at least 6 hydrophilic polymer arms, and wherein at least some of the hydrophilic polymer arms comprise (meth)acryl functionality.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like numerals in the drawings indicate like elements.

DETAILED DESCRIPTION

Figure 1:
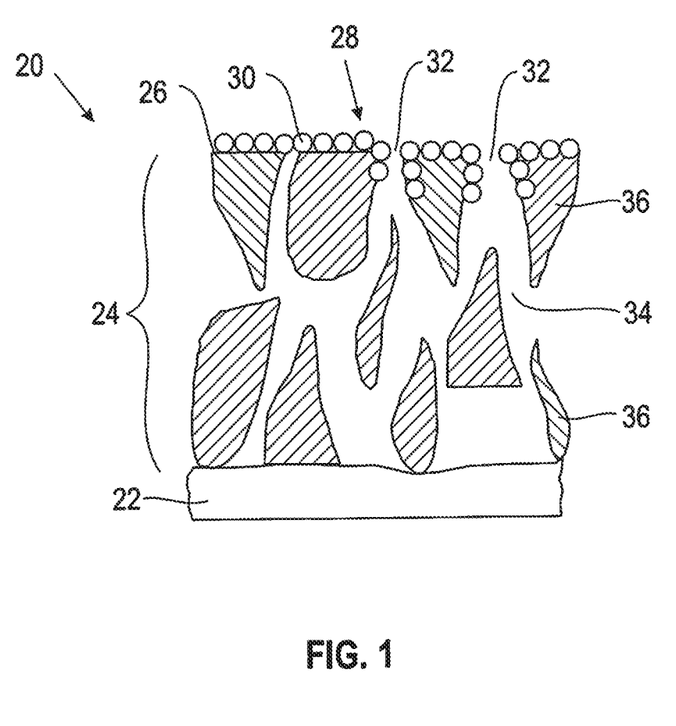
FIG. 1 is a schematic, cross-sectional view of a portion of a filtration membrane including an antifouling layer of functionalized star polymers.

Referring to FIG. 1, a filtration membrane 20 includes a porous layer 24 with a hydrophobic major surface 26. In various embodiments, the major surface 26 has thereon a hydrophilic antifouling coating 28 including at least one layer including functionalized star polymers 30.

The porous layer 24 overlain by the antifouling coating 28 can vary widely depending on the intended application, can be flexible or rigid, and can include an organic material, an inorganic material, a hybrid organic-inorganic material, a metal material, or a combination of the foregoing materials. In various embodiments, the porous layer 24 may include any type of filtration membrane with a molecular weight cut-off (MWCO) of greater than about 10 kilodaltons (kDa), or greater than about 50 kDa, or greater than about 100 kDa. In this application molecular weight cut-off or MWCO refers to the lowest molecular weight solute (in Daltons) in which 90% of the solute is retained by the membrane, or the molecular weight of the molecule (e.g., a globular protein) that is 90% retained by the membrane.

In various embodiments, the porous layer 24 has an average pore diameter of about 1 to about 1000 nm, about 1 to 100 nm (0.1 micrometer), about 1 to 50 nm, about 2 to about 30 nm, and even more particularly about 5 to about 20 nm. In this application the term porous refers to materials with pores that are regular and/or irregular voids and/or channels extending from one face to an opposite face of the layer 24. Microfiltration (MF) stock membranes have an average pore size of about 0.03 to about 10 µm and a MWCO of greater than 1000 Daltons. Ultrafiltration (UF) stock membranes have an average pore size of about 0.002 µm to about 0.1 µm and a MWCO of about 10,000 Daltons to 100,000 Daltons.

The pore size of poly(sulfone) (PSF) ultrafiltration stock membrane used in the examples below is about 5 nm to about 30 nm.

In various embodiments, the porous layer 24 can have a thickness of 1 micrometer to 10 millimeters, more particularly 1 micrometer to 100 micrometers, more particularly 1 micrometer to 80 micrometers, and even more particularly 1 micrometer to 50 micrometers.

Exemplary organic materials for the porous layer 24 include cellulose acetates, cellulose nitrates, regenerated celluloses, polysulfones, polyethersulfones, polypiperazine amides (such as those available under the trade designation FILMTEC from Dow Chemical, Midland, Mich.), polyacrylonitriles and copolymers, track-etched polyesters (e.g., those sold under the trade designation CYCLOPORE by Whatman Ltd.), polycarbonates (e.g., those sold under the trade designation NUCLEPORE by Whatman Ltd), poly (vinylidene difluoride), polypropylenes, Nylon 6,6, poly (tetrafluoroethylene)s (e.g., those sold under the trade names PORO-TEX and PARA-TEL by DeWAL Industries), and combinations of the foregoing materials.

Exemplary inorganic materials for the active layer of the stock membrane include nanoporous alumina ($Al_2O_3$) (e.g., those sold under the trade name ANOPORE by Whatman Ltd.), beryllia (BeO), titania ($TiO_2$), zirconia ($ZrO_2$), silica ($SiO_2$), magnesia (MgO), calcia (CaO), yttria ($Y_2O_3$), strontia (SrO), lanthana ($La_2O_3$), hafnia ($HfO_2$), oxides of iron, manganese oxide (MnO), carbides, nitrides, silicides, and combinations of the foregoing materials.

Exemplary metals that may be included in the porous layer 24 include, for example, nickel, nickel alloys, and stainless steel.

In some embodiments, the porous layer 24 can optionally be underlain by a support layer 22, which may be, for example, another membrane, a woven or a non-woven fibrous material, a polymeric film or a paper layer.

In some embodiments, the porous layer 24 can optionally be reinforced by organic and/or inorganic fillers (not shown in FIG. 1), which may be, for example, polyester woven mesh, carbon nanotubes, or zeolite nanoparticles.

The anti-fouling coating 28 on the major surface 26 of the porous layer 24 of the membrane 20 includes functionalized star polymers 30 with a hydrophobic core and a plurality of hydrophilic arms on the hydrophobic core. In this disclosure the term "star polymer" refers to any branched polymer including a plurality of linear polymer arms (at least six) attached at a central core. The Matyjaszewski group at Carnegie Mellon University provides general information regarding the structure and synthesis of various star copolymers at a site given by the concatenation of "cmu.edu" and "maty/materials/Polymers_with_specific_Architecture/star-copolymers.html."

In this disclosure the term hydrophobic refers to materials that are antagonistic to water or incapable of dissolving in water, while the term hydrophilic refers to materials that have a tendency to bind to or absorb water.

Referring again to FIG. 1, the anti-fouling coating 28 may be continuous or discontinuous, and may overlie all or a portion of the surface 26 of the porous layer 24. As shown in FIG. 1, in some embodiments the anti-fouling coating 28 includes some small gaps or pores 32. In some embodiments, the anti-fouling coating 28 can extend into the pores 34 of the porous layer 24 and coat portions of the fibers 36 of the porous layer 24.

The anti-fouling coating 28 includes a single layer of functionalized star polymers 30 (FIG. 1). In various embodiments, the thickness of the anti-fouling coating 28 is about 5 nm to about 20 nm.

The hydrophobic core, or the center, of the star polymers 30 making up the anti-fouling coating 28 can be an atom, molecule, or macromolecule, or a globular microgel (i.e., a cross-linked polymer gel of microscale proportions) and in some embodiments the core itself may be multifunctional. In various embodiments, the core contains aromatic, aliphatic, or mixed substituents with carbon only or mixtures containing heteroatoms. In some embodiments, the core is cross-linked and contains a plethora of surface functionality. In some embodiments, the core retains its shape by covalent crosslinking, although it could also be held together by electrostatic, hydrogen bonding, pi-stacking, or metal-ligand interactions.

In various embodiments the core of the star polymers 30 making up the antifouling coating 28 includes a hydrophobic polymer, and suitable example includes, but are not limited to, polyolefins, polystyrene (PS), poly(alkylmethacrylate), polyacrylamide, polycarbonate and polyester.

The chains, or "arms," of the star polymers 30 making up the antifouling coating 28 include variable-length organic chains, which can be made of similar or different monomers. At least some of the monomeric units have hydrophilic functionality. The arms can be chemically identical (homostars) or different (heterostars or miktoarm stars). In other embodiments, the arms may be composed of multiple monomers or polymers, resulting in star-block polymers or random star copolymers. In various embodiments, the star polymers include at least 6, or at least 10, or at least 20, or at least 30, or at least 60, arms covalently attached to the core.

In various embodiments, positively-charged moieties for the arms of star polymers include, but are not limited to, ammonium, phosphonium and sulfonium cations, as well as functional groups reasonably anticipated to become cationic in aqueous or acidic solution such as, for example, amines.

Non-limiting examples of useful negatively-charged moieties for the arms of star polymers include carboxylates, sulfonates, sulfinates, sulfonamides, phosphates, phosphinates, phosphonates, hydroxyamic acids, and imides.

In some embodiments, the hydrophilic arms may include zwitterionic moieties.

Non-limiting examples of other useful moieties for the arms of star polymers include, but are not limited to, hydrogen donors including alcohols or weak acids (COOH) with hydrogen acceptors containing ketones (for example, poly(N-vinylpyrrolidone)), amide (for example, poly(N-isopropylacrylamide) or hydroxyalkylamide), esters (for example, hydroxyalkylesters), ureas, thioureas, guanidines and alkylene oxide (for example, polyethylene oxide) moieties.

In various embodiments, the hydrophilically-functionalized arms of the star polymers include (meth)acryl functionality, wherein (meth)acryl includes acrylates and methacrylates. Suitable (meth)acryl functional groups for the star polymer arms include, but are not limited to, polyethylene glycol (PEG) (meth)acrylates such as polyethylene glycol methacrylate (PEGMA), (meth)acrylamides, amino (meth)acrylates such as dimethylaminoethyl methacrylate (DMAEMA), (meth)acrylic acids such as polymethacrylic acid (PMAA), zwitterionic moieties and combinations thereof.

In one non-limiting embodiment, a suitable star polymer for the anti-fouling coating 28 is shown in Formula 1 below:

The compound of Formula 1 includes an arrangement of a hydrophilic functional groups on its arms. In some embodiments, the functional group X on the hydrophilic arms can be selected from neutral hydrophilic species such as, for example, ethylene glycol, hydroxide, amines, alkylamino, zwitterionic groups, and the like. In other embodiments, the functional group X on the hydrophilic arms can be selected from charged hydrophilic species such as, for example, ammonium, phosphate, phosphonate, sulfonate, carboxylate, and the like. In other embodiments, the functional group X on the hydrophilic arms can be selected from combinations of neutral hydrophilic species and charged hydrophilic species.

In various embodiments, the functional region of the star polymer of Formula 1 can include dimethylaminoethyl (meth)acrylates (DMAEMA) containing monomers in an amount varying from 0 mol % to 100 mol %. In one example embodiment, the functional region of the star polymer of Formula 1 includes 55 mol % of DMAEMA containing monomers and 45 mol % of PEGMA-containing monomers. In another example embodiment, the functional region of the star polymer of Formula 1 includes 27 mol % DMAEMA-containing monomers and 73 mol % PEGMA-containing monomers. In another example embodiment, the functional Formula 1

Hydrophobic core

Hydrophilic Arms

In Formula 1, k is greater than or equal to about 6; n is greater than 10; a is greater than n; and X is selected from neutral hydrophilic species, zwitterionic species, charged hydrophilic species, and combinations of thereof.

In Formula 1, the star polymer includes a hydrophobic polymeric globular microgel polystyrene (PS) core with aromatic monomeric units and an arrangement of 6 or more, 10 or more, 20 or more, 30 or more, or 60 or more, polymeric arms attached to the microgel core.

As noted in Formula 1, a linking portion of the polymeric arms attached to the microgel core is formed from n units of homopolymers or random copolymers with monomeric units including alkyl, cycloalkyl, alkoxy, and combinations thereof, wherein n is greater than about 10, or about 20, or about 30, or about 50, or about 60.

region of the star polymer of Formula 1 includes 65 mol % of PEGMA-containing monomers and 35 mol % of PMAA-containing monomers. In another example embodiment, the functional region of the star polymer of Formula 1 includes 100 mol % PEGMA-containing monomers.

Star-shaped polymers can be synthesized through various approaches. The most common syntheses include an arm-first approach, in which the living chains are used as the initiators, and a core-first approach, in which the core is used as the initiator. Other synthetic routes include: controlled sol-gel processes, group transfer polymerization, transition metal catalysis, living anionic polymerization, living cationic polymerization, ring opening polymerization, ring-opening metathesis polymerization (ROMP), atom transfer radical polymerization (ATRP), reversible addition-fragmentation chain transfer polymerization (RAFT) and nitroxide mediated radical polymerization.

The hydrophobic cores of the star polymers are selected so that the star polymers "self-assemble" on the hydrophobic major surface 26 of the porous layer 24 to form the hydrophilic coating 28, which is a monolayer of star polymers. In this application the term "self-assemble" means the star polymers align with one another in an organized structure or pattern of building blocks. The interactions between the hydrophobic cores of the star polymers, which can be, for example, the result of any of Van der Waals attraction, electrostatic charge interaction or electronic (e.g., charge transfer) interaction or hydrogen bonding or metal-ligand interaction, cause the star polymers to align with one another on the surface 26 to form the star polymer monolayer coating 28. In some embodiments, the star polymers lie down adjacent to one another without external direction to form the monolayer coating 28.

While not wishing to be bound by any theory, presently available evidence indicates that the hydrophobic interaction between the hydrophobic cores of the star polymers and the hydrophobic membrane surface drives the self-assembly behavior of the star polymers on the hydrophobic membrane surface 26, and the multiplicity of hydrophilic arms on the star polymers modify the surface wetting behavior of the surface 26 and make the surface 26 more hydrophilic. The anti-fouling coating 28 effectively modifies the wettability of the surface 26 and the pores 34 of the porous layer 24 of the membrane 20, and the high-density hydrophilic arms on the star polymers enhance water transport (diffusion) within the porous layer 24.

In another aspect, the present disclosure is directed to a process of modifying the wettability of a surface of a filtration membrane and/or the pores of a filtration membrane. In this process the hydrophilicity of the surfaces of the pores of the support layer is altered by applying to the hydrophobic porous membrane surface a star polymer having a hydrophobic core and hydrophilic functional moieties on the exposed arms. The hydrophobic core of the star-polymer drives formation of a self-assembled monolayer of the star polymer through hydrophobic interaction with porous membrane surface, which changes the wettability of membrane surface hydrophilic by exposing the hydrophilic functional moieties on the surface. In one embodiment, the process includes exposing a porous filtration membrane to a solution including a star polymer with a hydrophobic core and hydrophilic arms for a time sufficient to form a monolayer of star polymers on the surface of the membrane and/or in the pores thereof.

In various embodiments, the star polymer solution can include any solvent that is compatible with other membrane materials, and water and alcohols have been found to be suitable. In some embodiments, the solvent in the star polymer solution is aqueous, or water. In various embodiments, the star polymer is present in the star polymer solution at a concentration of about 0.01 wt % to about 10 wt %, about 0.1 wt % to about 5 wt %, about 0.1 wt % to about 1 wt %, or about 0.1 wt % to about 0.5 wt %.

In various embodiments, the porous filtration membrane is exposed to the aqueous solution of the star polymer with a hydrophobic core and hydrophilic arms for about 1 minute to about 5 hours. Following exposure to the aqueous star polymer solution, the treated porous filtration membrane may optionally be drained to remove excess star polymer solution.

In some embodiments, the treated porous layer may optionally be dried by heating in an oven or by exposure to ambient or heated air.

In various embodiments, the porous layer 24 may optionally be rinsed with a solvent prior to or after the draining step, and suitable solvents include water, particularly deionized water.

The resulting membrane with the anti-fouling coating may then be incorporated into any suitable filtration apparatus for use in, for example, seawater desalination, wastewater treatment, emergency relief, or and power generation.

Various aspects of the present invention will now be demonstrated with reference to the following non-limiting examples.

EXAMPLES

Materials:
The star polymers used in the following examples are listed in Table 1.

TABLE 1

| No. | Composition (mol %) of hydrophilic arms | | | Diameter (nm) | Potential (mV) |
| --- | --- | --- | --- | --- | --- |
| | DMAEMA | PEGMA | PMAA | | |
| SP1 | 100 | 0 | 0 | 56 | 28.1 |
| SP2 | 55 | 45 | 0 | 62 | 7.5 |
| SP3 | 27 | 73 | 0 | 65 | 0.2 |
| SP4 | 0 | 65 | 35 | 44 | −17 |

General Procedure to Make Films and Characterization
Star Polymer Synthesis:

As described in patent U.S. Patent Publication No. 2011/0243848 A1, the star polymers of Table 1 above were synthesized with: (i) a hydrophobic polystyrene core, and (ii) hydrophilic arms of polyethylene glycol methacrylate (PEGMA: ethylene glycol repeating units=4.5) and dimethylaminoethyl methacrylate (DMAEMA) or polymethacrylic acid (PMAA) or a precursor thereto, which were each obtained from Sigma Aldrich, St. Louis, Mo. The ratio of the arm composition was controlled during synthesis. The particle size and zeta potential of star polymer in water were characterized by light scattering.

Surface Coating:
Two types of commercial UF membranes are selected, including a polysulfone membrane (available under the trade designation PS-20 from SePRO, Oceanside, Calif.) and a polyvinylidene fluoride (PVDF) membrane (available under the trade designation JW from GE Osmonics, Hopkins, Minn.). Each commercial membrane was pretreated with isopropanol for 30 min, washed with distilled water and then used as a support for the antifouling star polymer coating.

Star polymers were dissolved in water to prepare a coating solution (0.1 wt %). A porous UF membrane was fully coated using the 0.1 wt % star polymer solution by a surface-coating method for 30 min. Then the extra star polymer solution was removed and the membranes were washed by distilled water. After the membrane surface was dried by compressed air, the membranes were kept in distilled water.

Stability Test of Star Polymer Coated Membranes:
The membranes coated with star polymers were challenged in two categories of stability tests. (1) The modified membranes were soaked in NaOH solution (pH=10) for 1 hour. (2) The modified membranes were soaked in distilled water under ultrasonication for 1 hour. After the two tests, the coating integrity was tested by element analysis, SEM and water contact angle on the surface.

Anti-Fouling Test of Coated UF Membranes:

Evaluating anti-fouling efficiency of UF membranes before and after star polymer coating was studied using a crossflow filtration system with synthetic feed waters including target foulants such as oil emulsions. The oil emulsion (1500 ppm) was made with vegetable oil and a surfactant (available under the trade designation DS193 from Dow Chemical, Midland, Mich.) at a ratio of 9:1 by high speed mechanical stirring. The cross-flow filtration was conducted at 25° C. and 70 psi. Permeate flux was recorded by digital balances connected to a computer.

Example 1: Stability Evaluation of Star Polymer Coatings on UF Membranes

A polysulfone UF membrane (PS-20) was selected and coated with a 0.1 wt % solution of the star polymer SP2 in Table 1 on the top surface for 30 min. After coating, the membrane was rinsed by DI-water three times to remove excess star polymer. The surface was quickly dried with compressed air, and the membrane was maintained in DI-water for testing.

The resulting SP2-modified membrane was soaked in NaOH solution (pH=10) for 1 hour to test its chemical stability, or soaked in distilled water under ultrasonication for 1 hour to test its physical stability.

Then, the chemically or physically treated membranes were characterized by X-ray photoelectron spectroscopy (XPS) to measure the elements on the membrane surface, and by captive water bubble test to measure the hydrophilicity of the membrane surface.

X-Ray Photoelectron Spectroscopic (XPS) Analysis:

Elemental composition analysis was conducted using the Physical Electronics Quantum 2000 ESCA Microprobe with 200 µm scan size and 188 eV pass energy at a 45° take-off angle. The survey spectra were taken at 1100 eV. To study the chemical environment, carbon (1s), oxygen (1s), and nitrogen (1s) were captured with high resolution spectra using 58 eV pass energy at 0.5 eV per step. Binding energies were referenced to C (1s) maximum=284.8 eV.

The results in Table 2 below show that the SP2 antifouling coating increased the amount of nitrogen and oxygen, and reduced the amount of carbon and sulfur, on the UF membrane surface. These compositional changes represented the successful coating of the star polymer, because the star polymer SP2 has greater amounts of nitrogen and oxygen than the unmodified PS-20. The compositions of coated PS-20 membranes remained similar after chemical and physical treatment, which established the stability of the star polymer coating layer under the conditions of pH 10 and ultrasonication.

TABLE 2

| | Sample | | | |
|---|---|---|---|---|
| | C | N | O | S |
| PS-20 | 82.5 | 0 | 14.3 | 3.2 |
| SP2-coated PS-20 | 80.3 | 0.8 | 16.3 | 2.7 |

TABLE 2-continued

| | Sample | | | |
|---|---|---|---|---|
| | C | N | O | S |
| SP2-coated PS-20 after PH = 10 | 80.2 | 1.0 | 16.1 | 2.7 |
| SP2-coated PS-20 after ultrasonication | 80.0 | 1.0 | 16.4 | 2.6 |

Contact Angle Measurement:

Contact angle data were collected using a Dataphysics Contact Angle System OCA 20 using a captive bubbles approach. The sample was kept in the wet phase inside a deionized water bottle until analysis. Once the sample was rinsed and cut to 2 cm by 5 cm, it was mounted to a captive bubbles holder with the active surface facing down. The holder was submerged in deionized water inside a transparent water container to ensure that the membrane was fully submerged underneath the water during the evaluation. Using 5 µl of decane at 0.5 µl/s, the drop was inversely introduced to the active surface of the membrane. The captive bubbles were taken at approximately five seconds after the decane drop touched the membrane surface.

Table 3 below shows the surface wettability results measured by a captive bubble contact angle test, which clearly demonstrated that the water contact angle decreased from 83° to 50° after coating SP2 on the PS-20 UF membrane. The smaller water contact angle established the higher hydrophilicity of the coated membranes. Such changes remained after chemical and physical treatment, and the results confirmed the increased hydrophilicity and stability of the modified UF membrane.

TABLE 3

| | Sample | | | |
|---|---|---|---|---|
| | PS-20 | SP2 coated PS-20 | SP2 coated PS-20 after pH = 10 | SP2 coated PS-20 ultrasonication |
| Contact Angle | 83° | 50° | 53° | 53° |

Example 2—Evaluation of Pure Water Flux of Coated UF Membranes

The pure water flux of a UF membrane (PS-20, SePRO) before and after the application of four different star polymer coatings (SP1, SP2, SP3 and SP4 in Table 1 above) were studied using a dead-end filtration system with deionized water.

Figure 2:
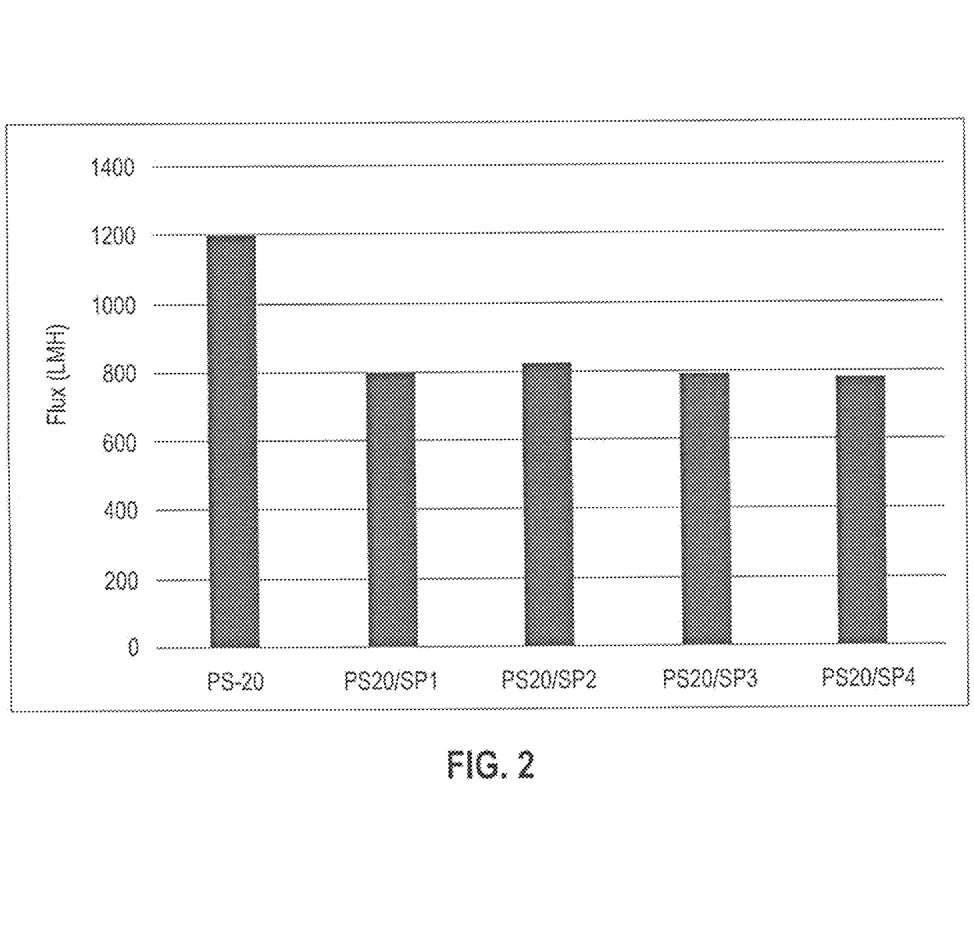
FIG. 2 is a plot of pure water flux of ultrafiltration (UF) membranes before and after coating by four different types of star polymers (SP1, SP2, SP3, and SP4 in the examples below).

As shown in FIG. 2, the star-polymer coated membranes retained ~70% of the initial water flux, and the permeation rate was still reasonably high for ultrafiltration (UF) membranes. While not wishing to be bound by any theory, it would be expected that membrane flux rates will decrease in a coated membrane when certain open pores might be blocked by the star polymers. But because of a very thin top layer coating, the modified membranes still maintain a high pure water flux (~800 LMH), which is in an acceptable range of UF membrane performance.

Example 3—Evaluation of Anti-Fouling Efficiency of Star Polymer Coated UF Membranes The anti-fouling efficiency of UF membranes before and after the star polymer coating was evaluated in a cross-flow filtration system with a feed solution of a synthetic oil/water emulsion.

Figure 3:
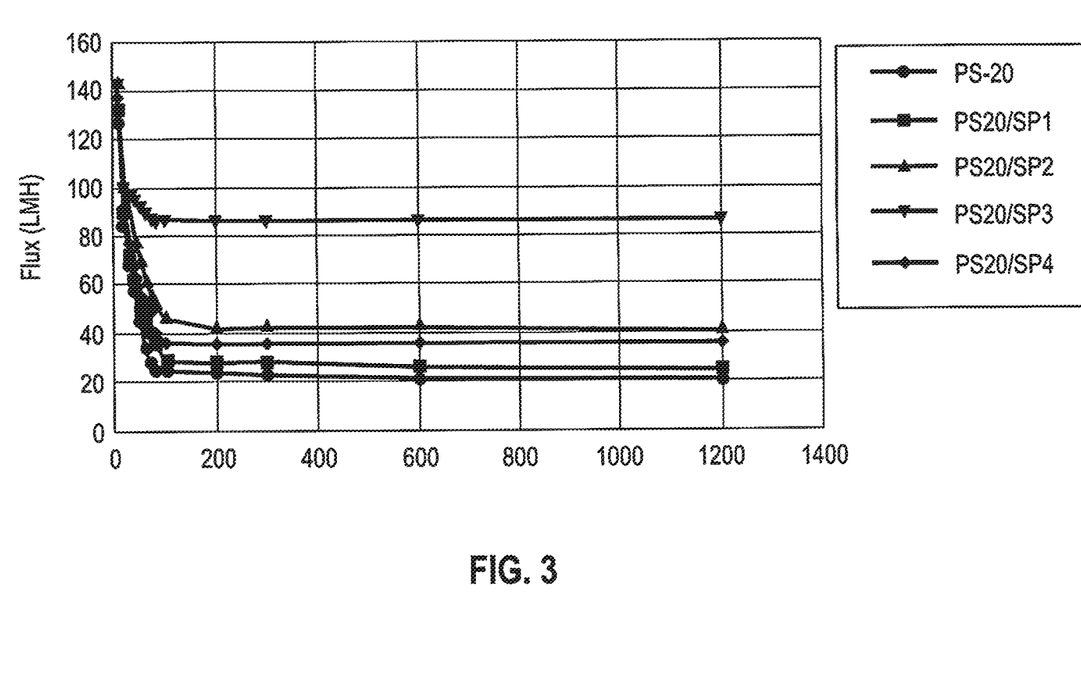
FIG. 3 is a plot of permeate flux vs. time for an oil/water emulsion in cross-flow filtration tests of polysulfone (PS) ultrafiltration (UF) membranes before and after coating by four different types of star polymers (SP1, SP2, SP3, and SP4 in the examples below).

FIG. 3 presents the water permeate flux as a function of operation time in oil-water emulsion cross-flow filtration. Compared with original commercial polysulfone UF membrane (PS20), the modified membrane with a coating of SP3 has the highest flux increase (~4 times greater), the membranes coated with SP2 (~2 times greater), the membranes coated with SP4 (1.5 times greater) and the membranes coated with SP1 (1.1 times greater) also show enhanced water flux.

While not wishing to be bound by any theory, presently available evidence indicates that the results can be explained by the amount of hydrophilic arms on the respective star polymers SP1-SP4. For example, the SP3-coated membrane had the highest amount of PEGMA, leading to the highest flux rate. In contrast, the SP1-coated membrane had no hydrophilic PEGMA, and exhibited a flux rate comparable with that of an uncoated membrane.

Example 4—Evaluation of Anti-Fouling Efficiency of Star Polymer Coated Polyvinylidene Fluoride (PVDF) UF Membranes The JW PVDF UF membrane described above was selected to demonstrate the antifouling efficiency of the anti-fouling coatings using the star polymers SP1-SP4 above. Because of its stability and hydrophobicity, PVDF is more challenging to modify with hydrophilic materials for anti-fouling. However, the hydrophobic properties of PVDF are particularly well suited to induce interaction with the hydrophobic core of the star polymers SP1-SP4.

After surface coating with each of the star polymers SP1-SP4, the PVDF UF membranes were evaluated by using the apparatus described in Example 3, which included a cross-flow filtration system with synthetic feed water including an oil emulsion.

Figure 4:
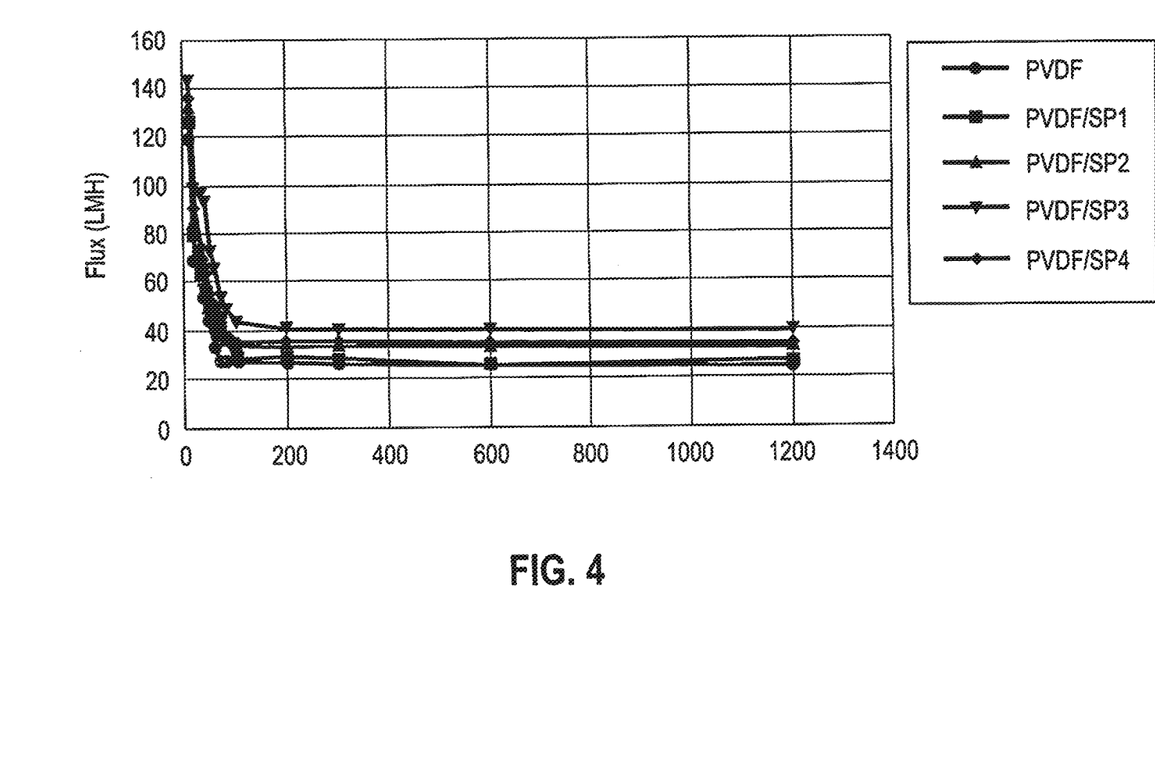
FIG. 4 is a plot of permeate flux vs. time for oil/water emulsion cross-flow filtration filtration tests of polyvinylidene fluoride (PVDF) membranes before and after coating by four different types of star polymers (SP1, SP2, SP3, and SP4 in the examples below).

FIG. 4 shows the water permeate flux as a function of operation time in oil-water emulsion cross-flow filtration. The results from the star-polymer coated PVDF UF membranes were consistent with the results from the polysulfone star-coated UF membranes of Example 3.

The antifouling ability demonstrated by the coated membrane increased according to the amount of PEG in the star polymer composition. For example, the SP3-coated membrane, with the most hydrophilic PEGMA arms, had the highest flux, about 1.6 times greater than the flux of the original PVDF membrane. The SP1 membrane, with no hydrophilic PEGMA, had a flux rate similar to that of an unmodified membrane.

The combined results of the anti-fouling tests of the PS (Example 3) and PVDF (Example 4) membranes coated by the star polymers SP1-SP4 establish that membrane coatings with the greatest amount of PEGMA had the highest flux rate, and the coating showed sufficient stability during a 20-hour cross-flow testing. The modified membranes were also stable in chemical tests (at pH=10) and when subjected to physical treatment (ultrasonication). The results are summarized in Table 4 below, in which the flux of the commercial PS-20 or PVDF membranes in oil/water emulsions was selected as a benchmark.

TABLE 4

Comparison of Flux Rates of Oil/Water Emulsions to Demonstrate the Anti-Fouling Efficiency of Membranes Coated with Star Polymers SP1-SP4

| | SP1 | SP2 | SP3 | SP4 |
|---|---|---|---|---|
| PS-20 | Comparable | 2 times greater | 4 times greater | 1.5 times greater |
| PVDF | Comparable | 1.3 times greater | 1.6 times greater | 1.3 times greater |

Example 5—Comparing a PSF UF Membrane Coated with Star Polymers SP1-SP4 to a PSF UF Membrane Coated with a Star Polymer Containing a Hydrophilic Core A solution of a star polymer with a hydrophilic core, PAMAM-tris(hydroxymethyl)amidomethane dendrimer, 1,12-diaminododecane core, generation 6, was obtained from Sigma-Aldrich, St. Louis, Mo. PAMAM 6 has hydrophilic arms constructed from both methyl acrylate and ethylenediamine, and as such is similar to the star polymers SP1-SP4 described above. However, unlike the star polymers SP1-SP4, which have a hydrophobic care, the PAMAM 6 core is made of a hydrophilic ethylenediamine moiety.

The coating technique described in Example 1 above was used to form an anti-fouling coating on a PS-20 membrane with PAMAM 6. Surface coating, characterization and anti-fouling evaluations of the membrane were performed the same manner as described in Examples 1-4 above.

There was no observed change of the water contact angle of the PS-20 membrane, which was 83 before coating and remained 83 after coating.

As shown in Table 5 below, elemental analysis using XPS also showed no significant changes in the elements on the membrane surface before and after coating.

TABLE 5

| | Sample | | | |
|---|---|---|---|---|
| | C | N | O | S |
| PS-20 | 82.5 | 0 | 14.3 | 3.2 |
| Modified PS-20 | 82.0 | 0 | 14.7 | 3.3 |

These data establish that PAMAM 6 with a hydrophilic core cannot bind strongly to the hydrophobic surface of the UF membrane. In contrast, an important binding force in the star polymer coatings made with the star polymers SP1-SP4 above is hydrophobic interaction between the hydrophobic core and the hydrophobic UF membrane surface.

This hydrophobic interaction also can drive the self-assembly behavior of star polymers on a hydrophobic UF membrane surface (hydrophobic interactions between star polymer core and membrane surface), which forms a chemically and mechanically stable coating layer.

Various embodiments of the invention have been described. These and other embodiments are within the scope of the following claims.

The invention claimed is:

1. A porous membrane with a molecular weight cut-off (MWCO) greater than about 10 kDa, and a coating on at least a portion of a surface of the porous membrane, wherein the coating comprises a monolayer of a star polymer, the star polymer comprising:

a hydrophobic core contacting the porous membrane, and at least six hydrophilic arms attached to the hydrophobic core, wherein the hydrophilic arms comprise (meth) acryl functionality selected from the group consisting of polyethylene glycol methacrylate (PEGMA), dimethylaminoethyl methacrylate (DMAEMA), methacrylic acid (PMAA), a precursor to PMAA, and combinations thereof.

2. The membrane of claim 1, wherein the core comprises a hydrophobic polymer selected from the group consisting of polyolefins, polystyrene, poly(alkyl-methacrylate), polyacrylamide, polycarbonate and polyester.

3. The membrane of claim 2, wherein the hydrophobic polymer comprises polystyrene.

4. The membrane of claim 1, wherein the membrane is a porous ultrafiltration (UF) or microfiltration (MF) membrane.

5. The membrane of claim 4, wherein the membrane comprises polysulfone (PSF).

6. The membrane of claim 4, wherein the membrane comprises polyvinylidene fluoride (PVDF).

7. The membrane of claim 1, wherein the monolayer is self-assembled.

8. The membrane of claim 1, wherein the polymer arms comprise DMAEMA and PEGMA.

9. A porous filtration membrane with a hydrophobic surface contacting a hydrophilic coating comprising a monolayer of star polymers, wherein the star polymer in the hydrophilic coating comprises the compound of Formula 1:

Formula 1 wherein, in Formula 1, the core comprises a hydrophobic polymer chosen from polyolefins, polystyrene poly (alkyl-methacrylate), polyacrylamide, polycarbonate and polyester; k is greater than or equal to about 6; n is greater than 10; a is greater than n; and X is selected from neutral hydrophilic species, zwitterionic species, charged hydrophilic species, and combinations of thereof.

* * * * *